(12) United States Patent
Kim et al.

(10) Patent No.: US 12,502,056 B2
(45) Date of Patent: Dec. 23, 2025

(54) ORAL SCANNER SYSTEM

(71) Applicant: OSSTEMIMPLANT CO., LTD., Seoul (KR)

(72) Inventors: Hyung Jin Kim, Seoul (KR); Eun Joong Kim, Seoul (KR)

(73) Assignee: OSSTEMIMPLANT CO., LTD., Seoul (KR)

( * ) Notice: Subject to any disclaimer, the term of this patent is extended or adjusted under 35 U.S.C. 154(b) by 309 days.

(21) Appl. No.: 18/277,677

(22) PCT Filed: Dec. 29, 2021

(86) PCT No.: PCT/KR2021/020211
§ 371 (c)(1),
(2) Date: Aug. 17, 2023

(87) PCT Pub. No.: WO2022/177140
PCT Pub. Date: Aug. 25, 2022

(65) Prior Publication Data
US 2024/0122462 A1    Apr. 18, 2024

(30) Foreign Application Priority Data

Feb. 19, 2021   (KR) .................. 10-2021-0022419
Feb. 19, 2021   (KR) .................. 10-2021-0022420

(51) Int. Cl.
*A61B 1/24*    (2006.01)
*A61B 1/00*    (2006.01)

(52) U.S. Cl.
CPC ............ *A61B 1/24* (2013.01); *A61B 1/00057* (2013.01); *A61B 1/00119* (2013.01); *A61B 1/00147* (2013.01); *A61B 1/00172* (2013.01)

(58) Field of Classification Search
CPC ... A61B 1/24; A61B 1/00057; A61B 1/00119; A61B 1/00147; A61B 1/00172; A61C 9/0053
See application file for complete search history.

(56) References Cited

U.S. PATENT DOCUMENTS

| | | | |
|---|---|---|---|
| 10,098,718 | B2 | 10/2018 | Kim et al. |
| 2017/0100225 | A1 | 4/2017 | Kim et al. |
| 2018/0333232 | A1 | 11/2018 | Lee |

FOREIGN PATENT DOCUMENTS

| | | | |
|---|---|---|---|
| KR | 10-1662566 B1 | 10/2016 |
| KR | 10-2016-0127979 A | 11/2016 |
| KR | 10-2018-0126164 A | 11/2018 |
| KR | 10-2018-0126177 A | 11/2018 |
| KR | 10-2129383 B1 | 7/2020 |
| KR | 10-2152921 B1 | 9/2020 |

OTHER PUBLICATIONS

International Search Report for PCT/KR2021/020211, dated Apr. 6, 2022.

*Primary Examiner* — Timothy J Neal
(74) *Attorney, Agent, or Firm* — Sughrue Mion, PLLC

(57) ABSTRACT

Provided in one embodiment of the present invention is a calibration device for an oral scanner, comprising: a casing in which an oral scanner body is coupled to an open upper part; a rotational part rotatably provided with respect to the casing; a reflector part arranged on the central axis of an optical device in the oral scanner body; and a pattern plate part facing the optical device through the reflector part, wherein the pattern plate part is linked with the rotation of the rotational part and rotates in place, and the reflector part moves in a straight line with respect to the oral scanner body.

14 Claims, 10 Drawing Sheets

ORAL SCANNER SYSTEM

CROSS REFERENCE TO RELATED APPLICATIONS

This application is a National Stage of International Application No. PCT/KR2021/020211 filed Dec. 29, 2021, claiming priority based on Korean Patent Application No. 10-2021-0022419 filed Feb. 19, 2021 and Korean Patent Application No. 10-2021-0022420 filed Feb. 19, 2021, the entire disclosures of which are incorporated herein by reference.

TECHNICAL FIELD

The present invention relates to an oral scanner system, and more particularly, to an oral scanner system for calibrating an oral scanner utilizing a pattern plate or the like to improve the accuracy of the oral scanner.

BACKGROUND ART

In a dental prosthesis manufacturing process, impression taking is an important process in manufacturing accurate prosthesis, and in the related art, an impression is taken using an impression material, and then a prosthesis is manufactured based on a produced plaster model, but there is a disadvantage in that an error occurs due to deformation of impression material and use of gypsum.

Accordingly, an optical three-dimensional (3D) scanner is used to measure oral structures such as teeth and gums using an optical 3D imaging device, and dental prostheses are manufactured using a CAD/CAM system, and in particular, in these days, a stereo vision method using images obtained from two or more imaging devices is applied to an oral scanner.

Since in the oral scanner of the stereo vision method, two or more pieces of image data are acquired by photographing a point in an oral cavity with two or more imaging devices and 3D distance information is acquired based on the image data, calibration of the oral scanner is frequently required for acquiring accurate 3D model data. For this reason, it is common to provide a calibration tool in the form of a cradle as a separate accessory to a 3D oral scanner.

Meanwhile, acquiring images of a pattern plate from various angles during calibration is helpful in improving the accuracy of calibration, but in a calibration cradle disclosed in Korean Patent Registration No. 10-2129383, the pattern plate is configured to be rotated in eight steps by 90 degrees in a circumferential direction and rectilinearly reciprocate in conjunction with the rotation, and thus, there is a disadvantage in that it is not possible to acquire an image of the pattern plate at any angle and depth other that a predetermined angle and depth.

TECHNICAL PROBLEM

The present invention has been made in view of solving the above-mentioned problem of the related art, and an object of the present invention is to provide a calibration device for an oral scanner having a simple structure, capable of acquiring images of a pattern plate at various angles and depths.

TECHNICAL SOLUTION

One aspect of the present invention provides a calibration device for an oral scanner, including a casing to which an oral scanner body is coupled to an open upper portion thereof, a rotating unit rotatably provided with respect to the casing, a reflector unit disposed on a central axis of an optical device in the oral scanner body, and a pattern plate unit facing the optical device through the reflector unit, wherein in conjunction with rotation of the rotating unit, the pattern plate unit rotates in place and the reflector unit rectilinearly reciprocates with respect to the oral scanner body.

In one embodiment, the rotating unit may include a rotating shaft extending in a longitudinal direction, a first coupling portion provided on one side of the rotating shaft and coupled to the pattern plate unit, and a second coupling portion provided on the other side of the rotating shaft and coupled to the reflector unit.

In one embodiment, a handle may be provided at one end of the rotating shaft.

In one embodiment, the pattern plate unit may include a pattern plate and a first interlocking portion integrally formed with the pattern plate and engaged with the first coupling portion, and the first interlocking portion may rotate by rotation of the first coupling portion.

In one embodiment, the reflector unit may include a reflector, a support portion configured to rotatably support the reflector, and a second interlocking portion rotatably coupled to the support portion and engaged with the second coupling portion, and in conjunction with rotation of the second coupling portion, the second interlocking portion may rotate and the reflector may be rectilinearly reciprocated.

In one embodiment, the reflector unit may further include a rotation preventing member configured to prevent the rotation of the reflector with respect to the second interlocking portion.

In one embodiment, the reflector may move along an inclined surface of the rotation preventing member when the reflector rectilinearly reciprocates so that an inclination angle is adjusted.

In one embodiment, at least one of one end and the other end of the inclined surface may be formed with a stepped portion configured to restrict movement of the reflector.

In one embodiment, the pattern plate unit may include a pattern plate and an interlocking portion integrally formed with the pattern plate and engaged with the first coupling portion, and the interlocking portion may rotate by rotation of the first coupling portion.

In one embodiment, the reflector unit may include a plurality of reflectors and a support portion configured to support the reflectors and engaged with the second coupling portion, and the support portion may rectilinearly reciprocate by rotation of the second coupling portion.

In one embodiment, the reflector may include a first reflector and a second reflector, the first reflector may be disposed to form an angle of 45 degrees on a central axis of the optical device, the second reflector may be disposed to form an angle of 45 degrees on a longitudinal axis of the pattern plate unit, and the first reflector and the second reflector may be disposed in mirror symmetry to reflect a direction of light emitted from the optical device 180 degrees.

In one embodiment, the reflector unit may further include a guide portion coupled to a rail formed in the casing.

In one embodiment, the reflector unit may rectilinearly reciprocate along the rail when the second coupling portion is rotated.

In one embodiment, at least one of one end and the other end of the rail may be formed with a stepped portion configured to restrict movement of the reflector uni.

ADVANTAGEOUS EFFECTS

According to one aspect of the present invention, since in conjunction with rotation of the rotating unit, a pattern plate rotates and a reflector rectilinearly reciprocates with respect to an oral scanner body, images of the pattern plate can be acquired at various angles and depths, and thus calibration accuracy can be improved.

Effects of the present invention are not limited to the above-described effects, but should be understood to include all effects that can be deduced from features of inventions described in the detailed description or the claims of the present invention.

MODES OF THE INVENTION

Figure 1:
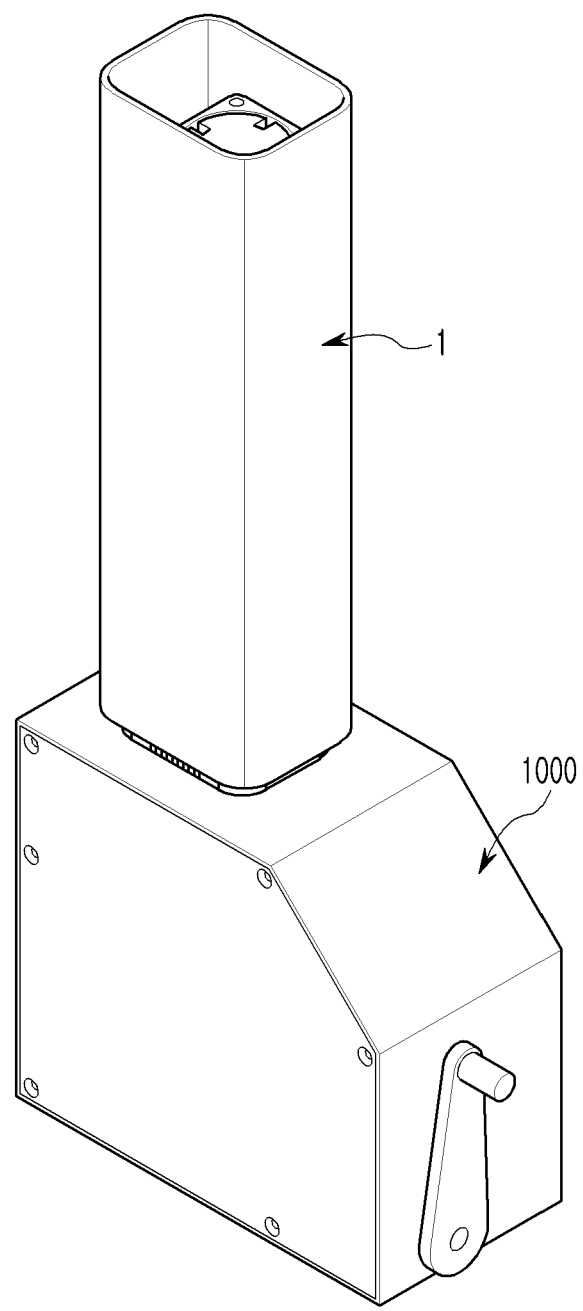
FIG. 1 is a perspective view of a calibration device for an oral scanner according to one embodiment of the present invention.

Hereinafter, the present invention will be described with reference to the accompanying drawings. However, the present invention may be implemented in various different forms and is not limited to the embodiments described herein. In the drawings, in order to clarify the present invention, parts that are not related to description are omitted and like reference numerals represent like elements throughout the specification.

When a part is referred to as being "connected" to another part throughout the specification, it includes not only a circumstance when the part is "directly connected" to the other part, but also a circumstance when the part is "indirectly connected" to the other part with another member interposed therebetween. In addition, when a part "includes" or "comprises" a component, unless described to the contrary, the term "includes" or "comprises" does not indicate that the part excludes another component but instead indicates that the part may further include the other component.

Terms including an ordinal number such as "first" or "second" used in this specification may be used to describe various components or steps, but the component or steps should not be limited by the ordinal numbers. A term used with an ordinal number should be construed such that the term is used for the sole purpose of distinguish one component or step from other components or steps.

First Embodiment

Figure 2:
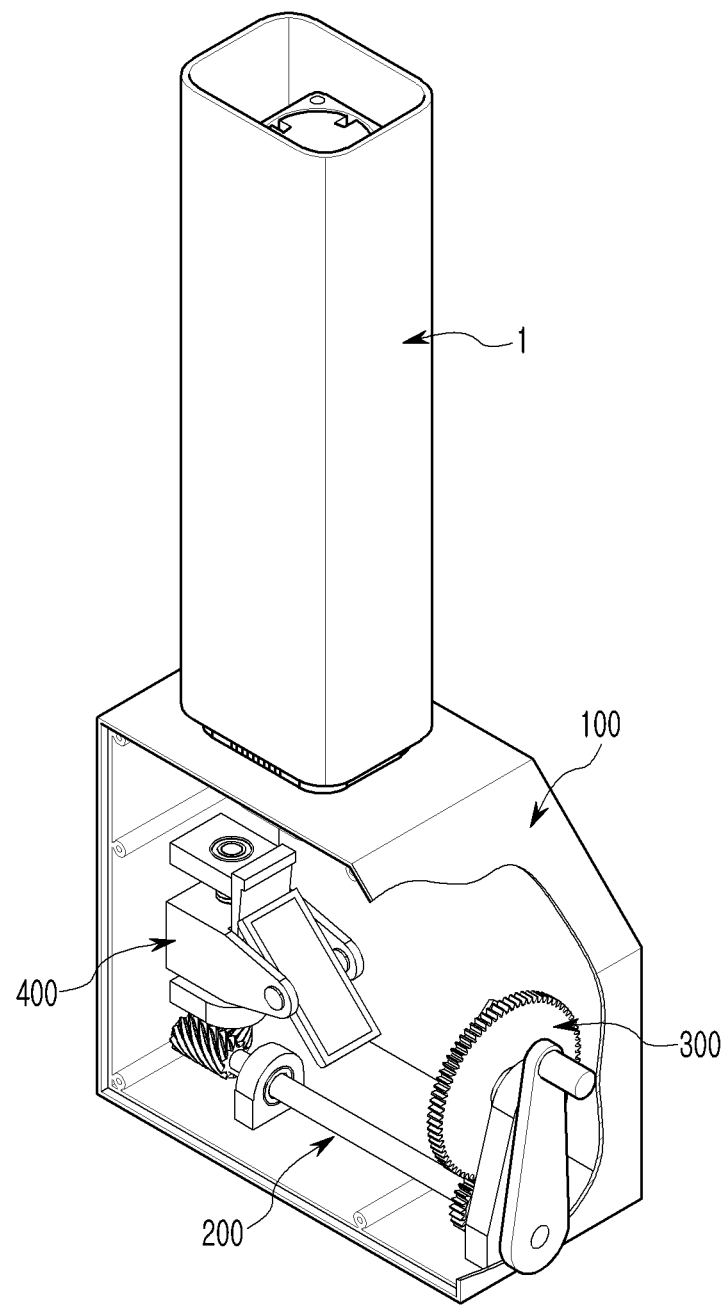
FIG. 2 is a perspective view of an inner space of the calibration device for an oral scanner according to one embodiment of the present invention.
Figure 3:
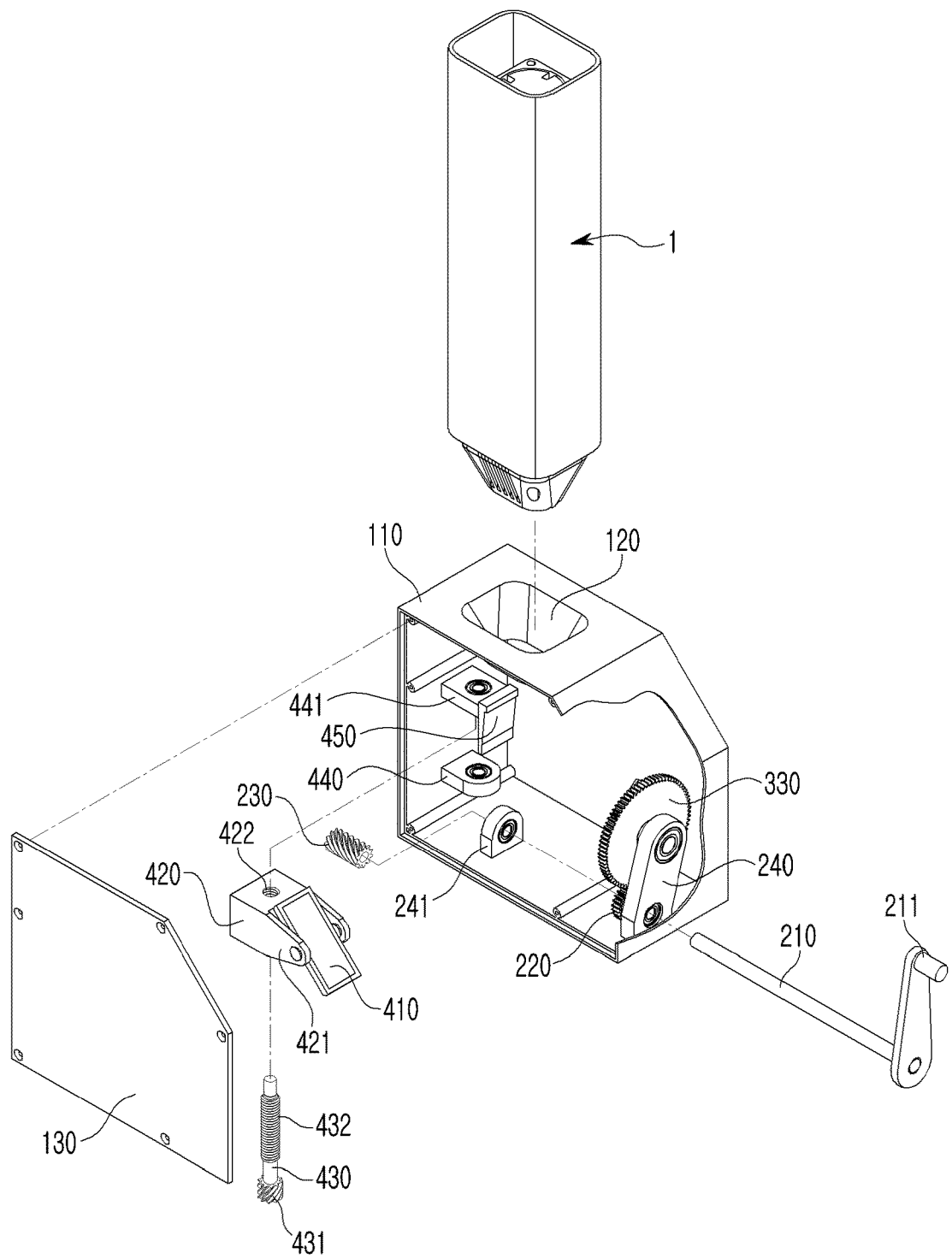
FIG. 3 is an exploded perspective view of FIG. 1.
Figure 4:
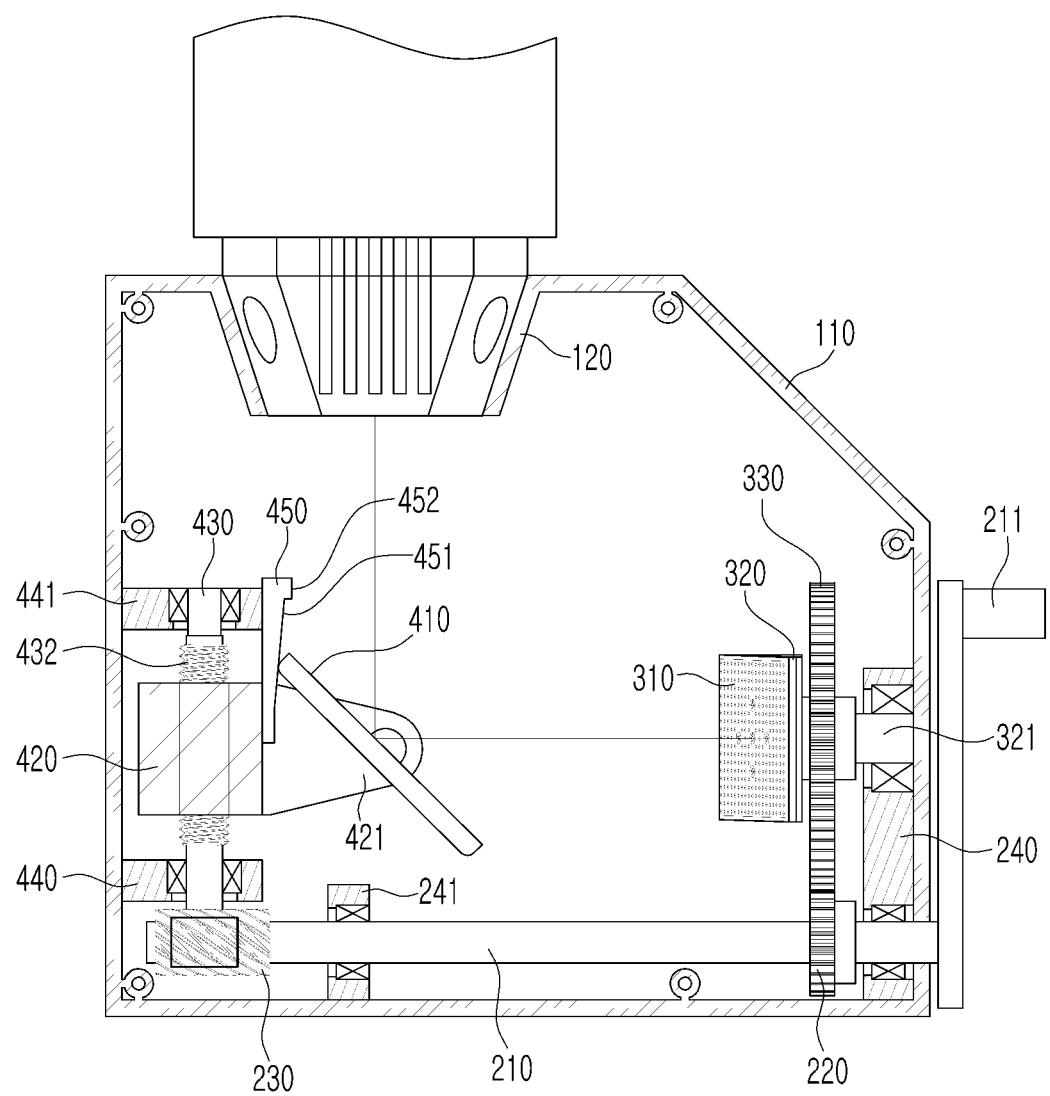
FIGS. 4 and 5 are cross-sectional views showing an operating process of the calibration device for an oral scanner according to one embodiment of the present invention.
Figure 5:
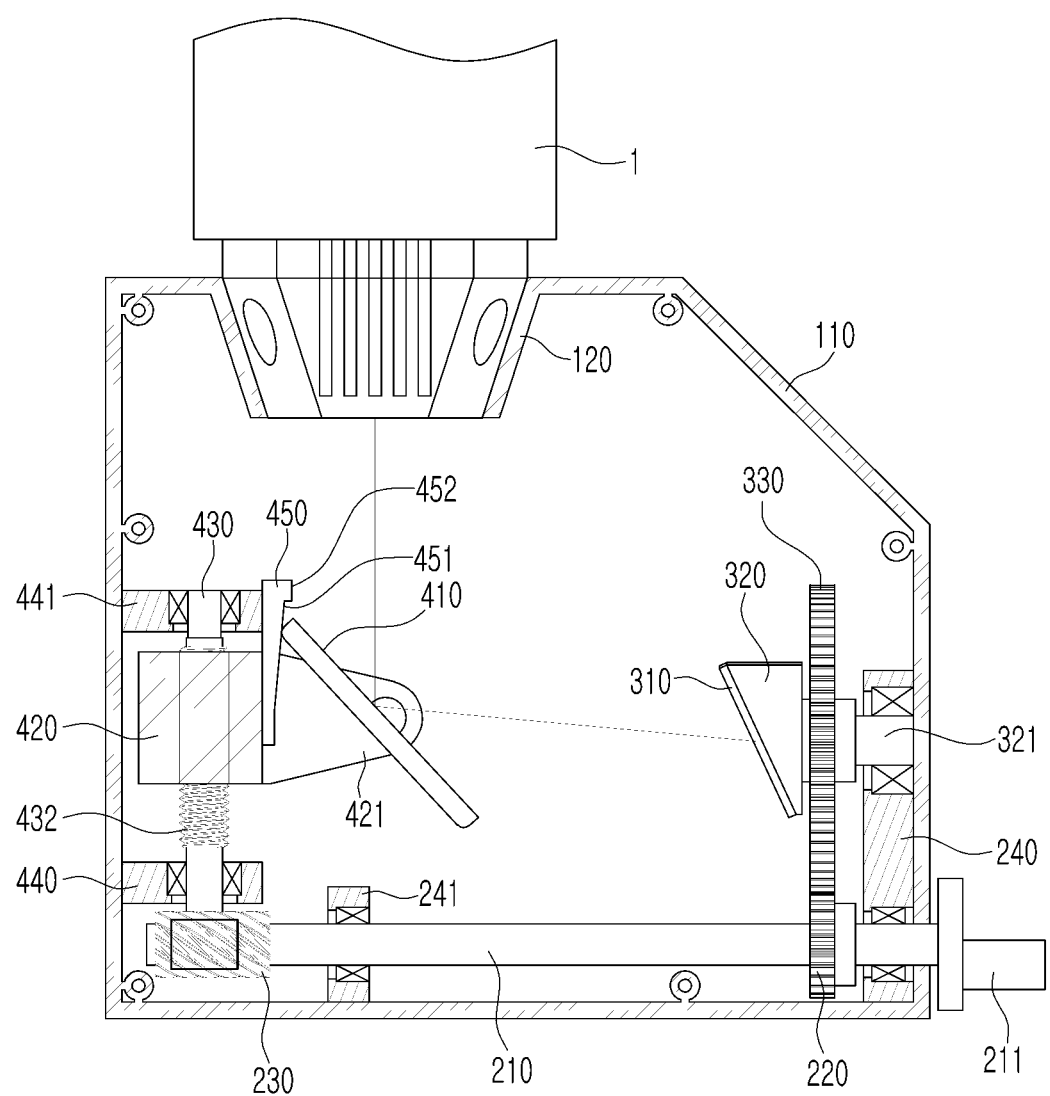

FIG. 1 is a perspective view of a calibration device for an oral scanner according to one embodiment of the present invention. FIG. 2 is a perspective view of an inner space of the calibration device for an oral scanner. FIG. 3 is an exploded perspective view of FIG. 1. FIGS. 4 and 5 are cross-sectional views showing an operating process of the calibration device for an oral scanner according to one embodiment of the present invention.

Hereinafter, embodiments of the present invention will be described in detail with reference to the accompanying drawings.

With reference to FIGS. 1 and 2, a calibration device 1000 for an oral scanner according to one embodiment of the present invention is a device for calibrating an optical device of an oral scanner, and includes a casing 100, a rotating unit 200, a pattern plate unit 300, and a reflector unit 400.

The casing 100 forms an outer circumferential surface of the calibration device 1000 for an oral scanner and includes a body 110 for forming an inner space, an insertion portion 120 that is formed on one side of an upper portion of the body 110 and into which an oral scanner body 1 is inserted and supported, and a cover 130 formed to cover one side of the body 110. In general, the oral scanner includes the oral scanner body 1 in which an optical device and an imaging board are disposed and a probe tip in which a reflective mirror is disposed therein, and the optical device includes a light source for emitting light toward an opening of the oral scanner body 1 and a pair of imaging devices for collecting light introduced through the opening onto the imaging board.

In this case, since scanning of the subject's oral cavity is performed by inserting the probe tip into a subject's oral cavity, a reflective member may be filled with moisture in the subject's oral cavity, and thus calibration accuracy may be reduced when calibration is performed with the probe tip attached. Therefore, in order to minimize the negative effect of the reflective member, it is desirable that only the oral scanner body 1 from which the probe tip is removed is inserted into the casing 100.

Preferably, to allow the oral scanner body 1 to be fixed to the insertion portion 120, the insertion portion 120 may be formed to correspond to a shape of an end of the oral scanner body 1. More preferably, at the end of the oral scanner body 1, a groove may be formed along a circumferential direction of the end, and around an inner circumferential surface of the insertion portion 120, protrusion corresponding to the groove may be formed. In this case, when the oral scanner body 1 is inserted into the insertion portion 120, the groove and the protrusion may be coupled so that the oral scanner body 1 may be firmly fixed to the insertion portion 120.

As shown in FIG. 2, the body 110 may have a trapezoidal shape in which a space is formed therein, but is not limited thereto, and various shapes may, of course, be applied. Light emitted from the light source of the oral scanner body 1 is incident on the reflector unit 400 disposed inside the body 110 to be described below.

Meanwhile, the pattern plate unit 300 according to one embodiment of the present invention is provided on an inner circumferential side of the body 110 so that a longitudinal axis thereof is positioned on an axis orthogonal to a central axis of the oral scanner body 1. Accordingly, the pattern plate unit 300 faces the optical device inside the oral scanner body 1 through the reflector unit 400 to be described below, and includes a pattern plate 310 and a seating portion 320.

In detail, the pattern plate 310 may be formed in a square shape, and various patterns may be formed. For example, the pattern may be formed in a grid pattern in which the light and shade between vertically and horizontally adjacent grids are clearly distinguished.

The pattern plate 310 is seated on the seating portion 320. In this case, an inclination angle of the pattern plate 310 is preferably set to be 40 degrees or more and less than 50 degrees based on light that is reflected through a reflector 410 and incident. When the pattern plate 310 is disposed to be orthogonal to the incident light, there is a disadvantage in that each pattern formed on the pattern plate 310 has the same depth information (or height information) on the same surface, and accordingly, the pattern plate 310 is disposed to be inclined at a predetermined angle with respect to the incident light in design, thereby increasing a calibration effect. To this end, it is preferable to form an upper surface of the seating portion 320 on which the pattern plate 310 is seated as an inclined surface forming an inclination angle of 40 degrees or more and less than 50 degrees with respect to a longitudinal direction of the seating portion 320.

The seating portion 320 includes an extension portion 321 (drawing added) formed to extend in the longitudinal direction together with the above-described inclined surface, and the extension portion 321 is rotatably supported by a holding portion 240 of the rotating unit 200 to be described below.

The pattern plate unit 300 further includes a first interlocking portion 330 formed integrally with the extension portion 321 formed at a lower end of the seating portion 320 to rotate in conjunction with rotation of the rotating unit 200 to be described below. As shown, the first interlocking portion 330 is preferably formed in the shape of a spur gear, but is not limited thereto, and various gears may, of course, be applied.

Meanwhile, the reflector unit 400 according to one embodiment of the present invention includes the reflector 410 for reflecting light emitted from the optical device of the oral scanner body 1 toward the above-described pattern plate 310 and a support portion 420 for supporting the reflector 410 to be inclined with respect to the oral scanner body 1. Specifically, the reflector 410 may be formed of a rectangular mirror, but is not limited thereto, and mirrors of various shapes may, of course, be applied.

The support portion 420 includes a rectangular parallelepiped body and free ends 421 extending in the longitudinal direction from both sides of the body, and the reflector 410 is rotatably coupled to the free ends 421. To this end, protrusions are formed on both sides of a rotation center of the reflector 410, and the protrusions are coupled to openings formed in the free ends 421.

In addition, the reflector unit 400 further includes a second interlocking portion 430 to rectilinearly reciprocate in conjunction with the rotation of the rotating unit 200 to be described below. Specifically, the second interlocking portion 430 is formed in the shape of a shaft formed to extend long in the longitudinal direction, and at its end, a rotation gear 431 formed to engage with a second coupling portion 230 of the rotating unit 200 to be described below is provided. As shown, the rotation gear 431 is preferably formed in the shape of a helical gear, but is not limited thereto, and various gears may, of course, be applied.

Preferably, as shown in FIG. 3, holding portions 440 and 441 for supporting both sides of the second interlocking portion 430 so that the second interlocking portion 430 is rotatable may be provided on an inner circumferential surface of the body 110, and more preferably, bearings for smooth rotation of the second interlocking portion 430 may be provided on inner circumferential surfaces of the holding portions 440 and 441.

Preferably, the second interlocking portion 430 is formed to pass through the support portion 420, a first screw thread 432 is formed on an outer circumferential surface of the second interlocking portion 430, and a second screw thread 422 corresponding to the first screw thread 432 is formed on an inner circumferential surface of a through hole of the support portion 420.

In this case, the reflector unit 400 according to one embodiment of the present invention may further include a rotation preventing member 450 so that the reflector 410 and the support portion 420 rectilinearly reciprocate along a longitudinal direction of the second interlocking portion 430.

Specifically, as shown in FIG. 3, the rotation preventing member 450 is formed on an upper surface of the holding portion 440 in a plate-like shape, and an end of the reflector 410 is seated on an upper surface of the rotation preventing member 450. Accordingly, when the second interlocking portion 430 is rotated in conjunction with the rotating unit 200 to be described below, the rotation of the reflector 410 and the support portion 420 is prevented by the rotation preventing member 450, and thus rotation is made between the first screw thread 432 and the second screw thread 422, so that the reflector 410 and the support portion 420 rectilinearly move.

Preferably, a torsion spring may be disposed at the rotation center of the reflector 410 with respect to the support portion 420, and in this case, the reflector 410 may move in close contact with the upper surface of the rotation preventing member 450.

In this case, since, for the rotation preventing member 450, any member is sufficient as long as it prevents the reflector 410 and the support portion 420 from being distorted, various shapes may, of course, be applied.

Meanwhile, as described above, since in the oral scanner of the stereo vision method, three-dimensional distance information is acquired based on two pieces of image data with a point in the oral cavity as the same focus, calibration of the oral scanner is frequently required for acquiring accurate 3D model data. In this case, when images of the pattern plate 310 are acquired at various angles and depths, calibration accuracy may be improved.

To this end, the calibration device 1000 for an oral scanner according to one embodiment of the present invention further includes the rotating unit 200 that rotates in conjunction with the pattern plate unit 300 and the reflector unit 400 described above.

The rotating unit 200 is provided on the inner circumferential surface of the body 110 on the opposite side to the insertion portion 120, and includes a rotating shaft 210, a first coupling portion 220, and the second coupling portion 230. The rotating shaft 210 extends long to be perpendicular to the longitudinal direction of the oral scanner body 1, and coupling portions engaged with the pattern plate unit 300 and the reflector unit 400 are provided on one side and the other side thereof.

Specifically, the first coupling portion 220 having a spur gear shape is disposed on one side of the rotating shaft 210 and is engaged with the first interlocking portion 330 of the pattern plate unit 300 described above. Accordingly, when the rotating shaft 210 is rotated, the first interlocking portion 330 engaged with the first coupling portion 220 is rotated, so that the pattern plate unit 300 rotates around a longitudinal axis.

Preferably, when the rotating shaft 210 rotates 360 degrees, the pattern plate unit 300 may rotate 90 degrees, but the rotation is not limited thereto.

Preferably, one side of the rotating shaft 210 may pass through the body 110 and extend to the outside of the body 110, and at its end, a handle 211 for allowing a user to easily rotate the rotating shaft 210 may be formed. However, the rotation is not limited to manual rotation by the user as such, and automatic rotation by a motor or the like may be made.

Preferably, as shown in FIG. 3, holding portions 240 and 241 for supporting both sides of the rotating shaft 210 so that the rotating shaft 210 is rotatable may be provided on the inner circumferential surface of the body 110, and in this case, it is preferable that the holding portion 240 positioned closer to the pattern plate unit 300 supports the extension portion 321 of the seating portion 320 of the pattern plate unit 300 as well as the rotating shaft 210. More preferably, bearings for smooth rotation of the rotating shaft 210 and the pattern plate unit 300 may be provided on inner circumferential surfaces of the holding portions 240 and 241.

On the other side of the rotating shaft 210, the second coupling portion 230 having a screw gear shape is disposed, and the second coupling portion 230 is engaged with the rotation gear 431 of the reflector unit 400 described above. When the rotating shaft 210 is rotated about its longitudinal axis, the rotation gear 431 engaged with the second coupling portion 230 is rotated about a longitudinal axis of the second interlocking portion 430 orthogonal to the longitudinal axis of the rotating shaft 210. Accordingly, the support portion 420 coupled to the first screw thread 432 of the second interlocking portion 430 rectilinearly reciprocates along the longitudinal direction of the second interlocking portion 430, and thus the support portion 420 and the reflector 410 coupled to the support portion 420 reciprocate based on the central axis of the oral scanner body 1.

Preferably, when the rotating shaft 210 rotates 360 degrees, the reflector 410 may rectilinearly reciprocate by 1 mm, but is not limited thereto.

Meanwhile, since the pattern plate 310 rotates in place, when an inclination angle of the reflector 410 is not changed when the position of the reflector 410 with respect to the oral scanner body 1 is changed, the light emitted from the optical device may be reflected toward a place spaced apart from a center of the pattern plate 310.

Specifically, as shown in FIG. 4, when the center of the reflector 410 coincides with the center of the pattern plate 310, the light emitted from the optical device reaches the center of the pattern plate 310 when the reflector 410 maintains an angle of 45 degrees.

However, when the reflector 410 approaches the optical device as shown in FIG. 5, since the center of the reflector 410 does not coincide with the center of the pattern plate 310, an incidence angle and reflection angle of the light emitted from the optical device should increase. Conversely, when the reflector 410 moves away from the optical device, the incidence angle and reflection angle of the light emitted from the optical device should decrease.

Therefore, the calibration device 1000 for an oral scanner according to one embodiment of the present invention is characterized by adjusting the inclination angle of the reflector 410 through the rotation preventing member 450 when the reflector 410 rectilinearly reciprocates.

Specifically, as shown in FIGS. 3 to 5, it is preferable that the rotation preventing member 450 is formed of an inclined surface 451 whose thickness becomes thicker as the inclined surface 451 approaches the oral scanner body 1.

For example, when the reflector 410 approaches the oral scanner body 1, the reflector 410 moves along an upper side of the inclined surface 451, so that the inclination angle with respect to the oral scanner body 1 decreases, and the incidence angle and reflection angle of light increase. In addition, when the reflector 410 moves away from the oral scanner body 1, the reflector 410 moves along a lower side of the inclined surface 451, so that the inclination angle with respect to the oral scanner body 1 increases, and the incidence angle and reflection angle of light decrease.

Preferably, the inclination angle of the inclined surface 451 may be designed so that the light reflected from the reflector 410 is directed toward the center of the pattern plate.

More preferably, at least one of one end and the other end of the inclined surface 451, may be formed with a stepped portion 452 for restricting rectilinear movement of the reflector 410.

As such, since in conjunction with the rotation of the rotating unit 200, the pattern plate 310 rotates and the position of the reflector 410 with respect to the oral scanner body 1 is changed, images of the pattern plate 310 may be acquired at various angles and depths during calibration, and thus calibration accuracy may be improved.

Hereinafter, an operating process of the calibration device 1000 for an oral scanner according to one embodiment of the present invention will be described in detail.

When a user grabs and rotates the handle 211 provided outside the body 110 of the casing 100, the rotating shaft 210 integrally formed with the handle 211 rotates. When the first interlocking portion 330 engaged with the first coupling portion 220 disposed on one side of the rotating shaft 210 is rotated by the rotation of the rotating shaft 210, the pattern plate unit 300 rotates around its longitudinal axis. At the same time, the second interlocking portion 430 engaged with the second coupling portion 230 disposed on the other side of the rotating shaft 210 rotates about the longitudinal axis. Accordingly, the support portion 420 coupled to the first screw thread 432 of the second interlocking portion 430 laterally reciprocates along the longitudinal axis of the second interlocking portion 430, and thus the reflector 410 coupled to the support portion 420 rectilinearly reciprocate with respect to the oral scanner body 1.

That is, since in conjunction with the rotation of the rotating unit 200, the pattern plate 310 rotates and the reflector 410 rectilinearly reciprocates with respect to the oral scanner body 1, images of the pattern plate 310 may be acquired at various angles and depths and thus calibration accuracy may be improved.

Second Embodiment

Figure 6:
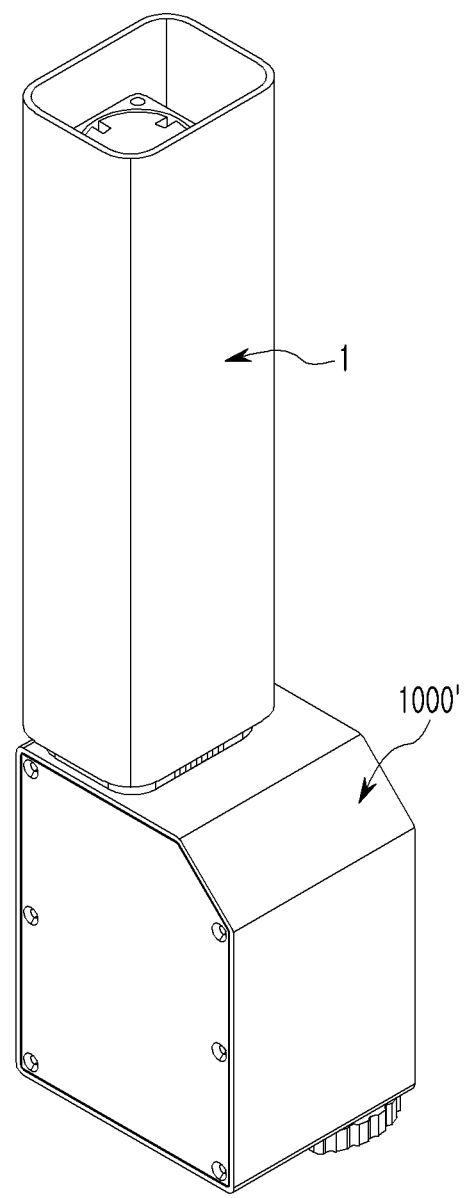
FIG. 6 is a perspective view of a calibration device for an oral scanner according to another embodiment of the present invention.
Figure 7:
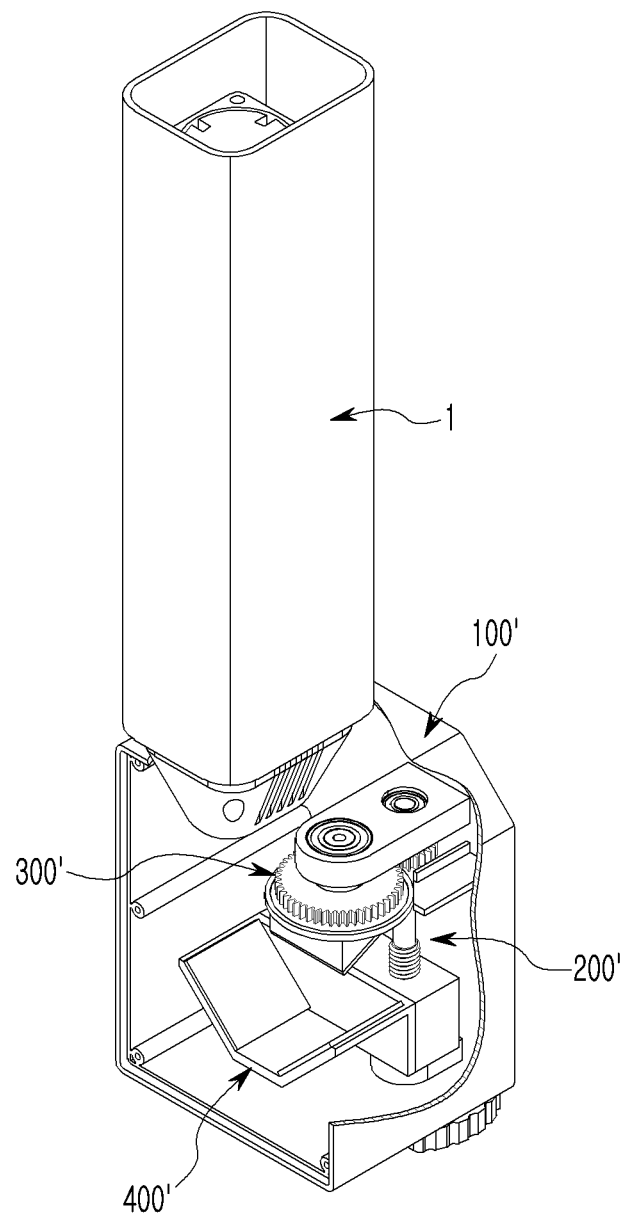
FIG. 7 is a perspective view of an inner space of the calibration device for an oral scanner according to another embodiment of the present invention.
Figure 8:
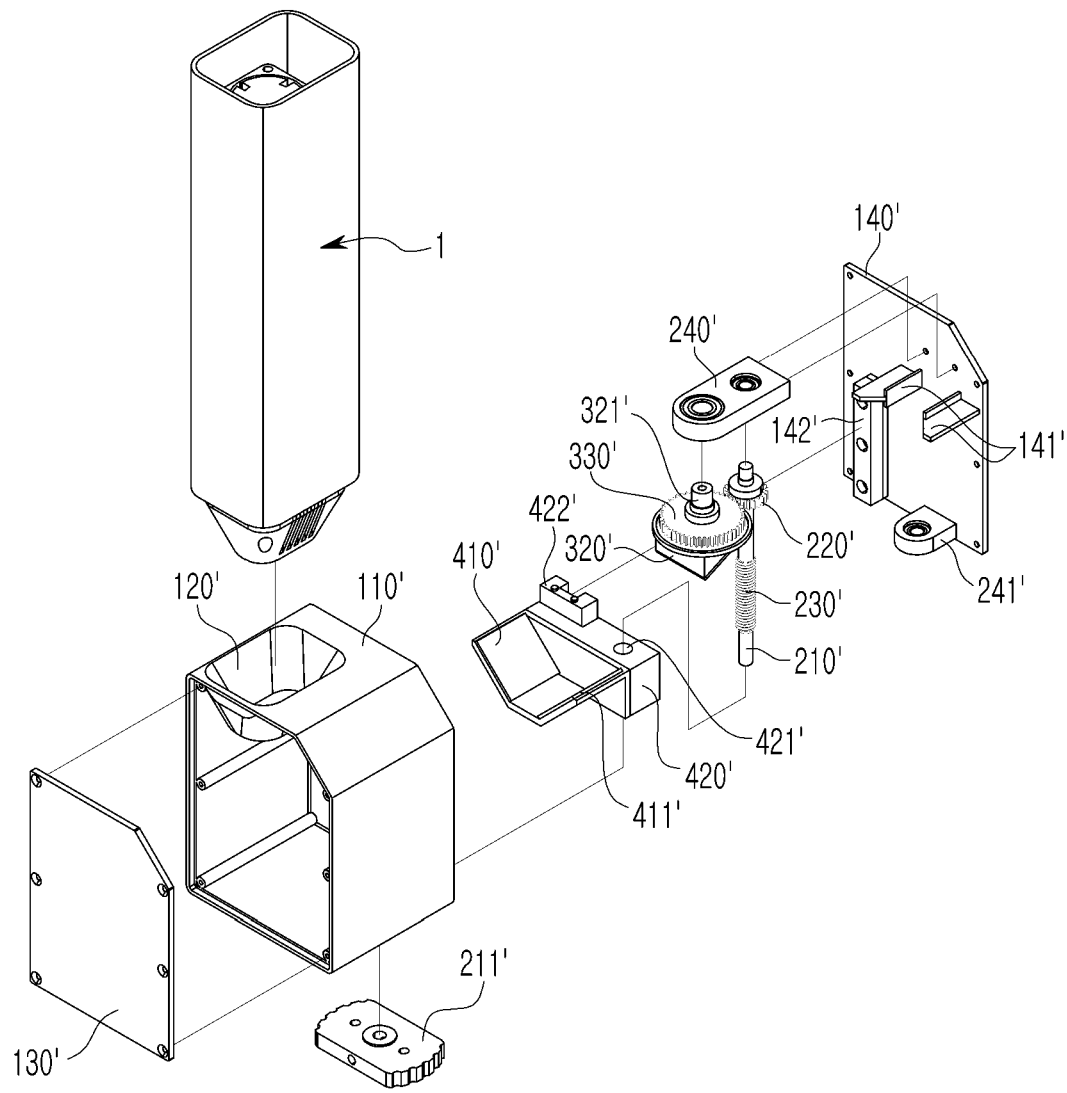
FIG. 8 is an exploded perspective view of FIG. 6.
Figure 9:
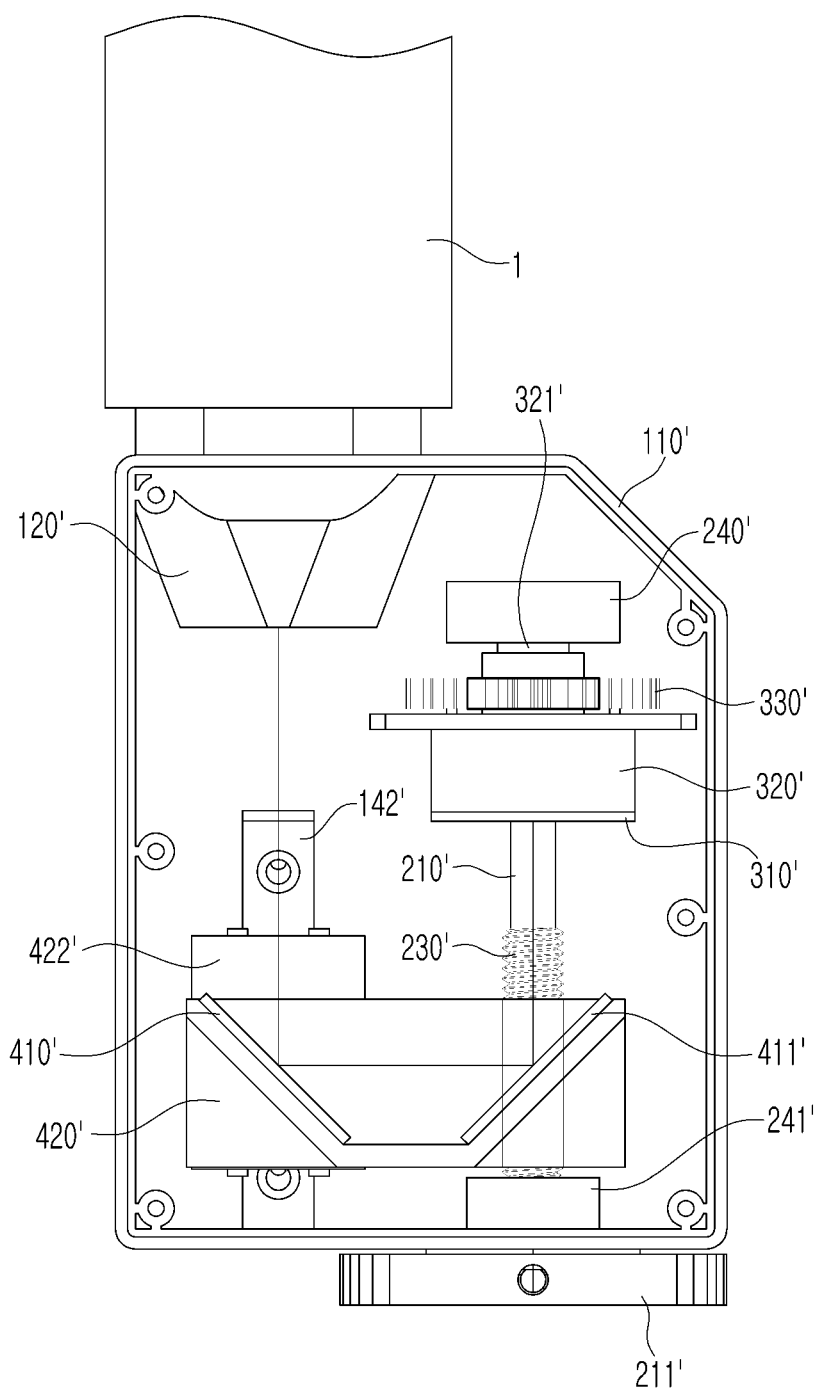
FIGS. 9 and 10 are cross-sectional views showing an operating process of the calibration device for an oral scanner according to another embodiment of the present invention.
Figure 10:
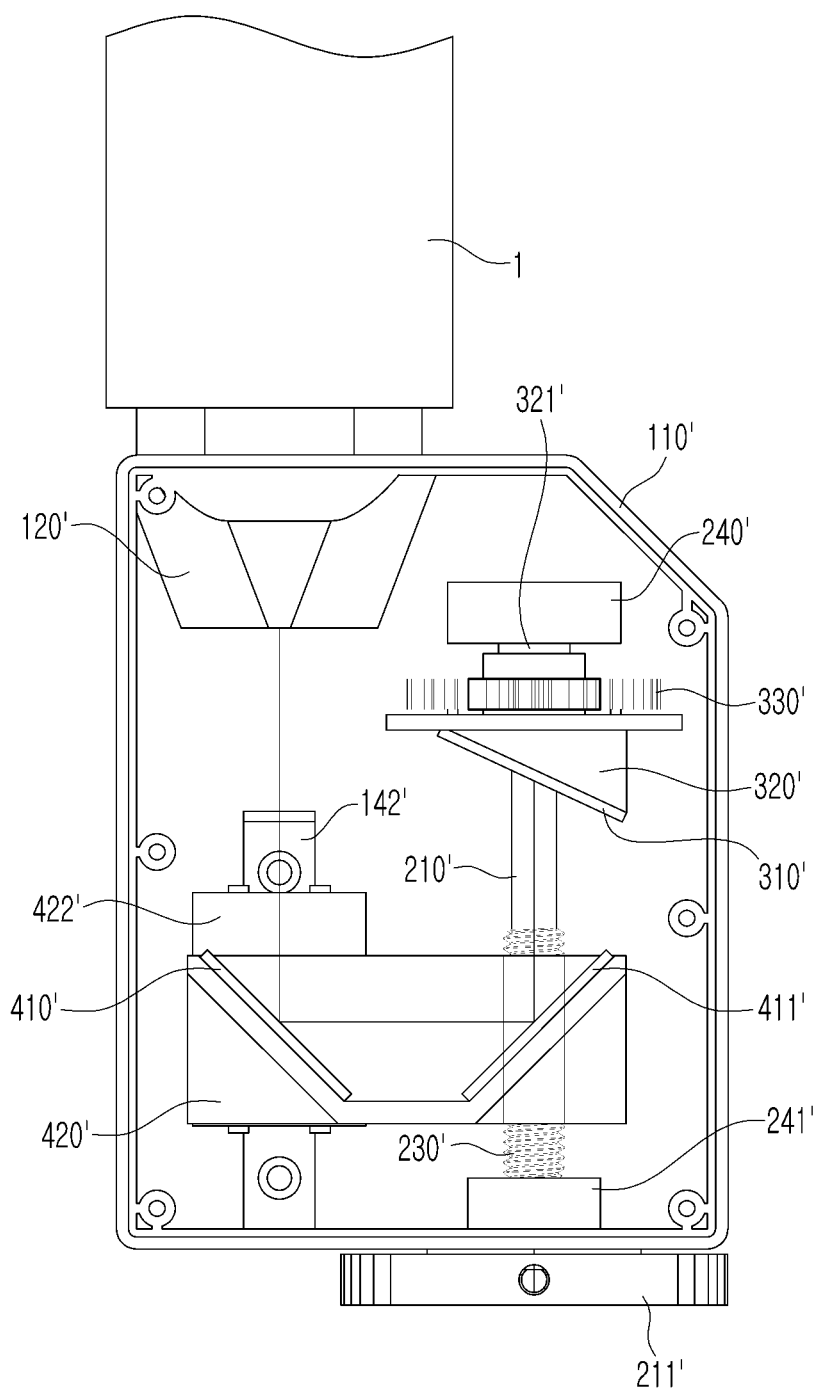

FIG. 6 is a perspective view of a calibration device for an oral scanner according to another embodiment of the present invention, FIG. 7 is a perspective view of an inner space of the calibration device for an oral scanner according to another embodiment of the present invention, FIG. 8 is an exploded perspective view of FIG. 6, and FIGS. 9 and 10 are cross-sectional views showing an operating process of the calibration device for an oral scanner according to another embodiment of the present invention.

Hereinafter, a calibration device 1000' for an oral scanner according to another embodiment (second embodiment) of the present invention will be described with reference to FIGS. 6 to 10. Parts overlapping with those of the first embodiment are omitted.

With reference to FIGS. 6 and 7, the calibration device 1000' for an oral scanner according to another embodiment of the present invention is a device for calibrating an optical device of an oral scanner, and includes a casing 100', a rotating unit 200', a pattern plate unit 300', and a reflector unit 400'.

The casing 100' forms an outer circumferential surface of the calibration device 1000' for an oral scanner and includes a body 110' for forming an inner space, an insertion portion 120' that is formed on one side of an upper portion of the body 110' and into which an oral scanner body 1 is inserted and supported, and first and second covers 130' and 140' formed to cover both sides of the body 110'.

Meanwhile, the pattern plate unit 300' according to another embodiment of the present invention is provided in the body 110' so that a longitudinal axis thereof is positioned on an axis parallel to a central axis of the oral scanner body 1. Accordingly, the pattern plate unit 300' faces the optical device in the oral scanner body 1 through the reflector unit 400' to be described below, and includes a pattern plate 310' and a seating portion 320'.

The seating portion 320' includes an extension portion 321 (drawing added) formed to extend in the longitudinal direction together with an inclined surface, and the extension portion 321' is rotatably supported by a holding portion 240' of the rotating unit 200' to be described below. More preferably, a support portion 141' for supporting the seating portion 320' may be formed to extend on an inner surface of the second cover 140' so that the seating portion 320' is supported by the support portion 141'.

The pattern plate unit 300' further includes an interlocking portion 330' formed integrally with the extension portion 321' formed at a lower end of the seating portion 320' to rotate in conjunction with rotation of the rotating unit 200' to be described below. As shown, the interlocking portion 330' is preferably formed in the shape of a spur gear, but is not limited thereto, and various gears may, of course, be applied.

Meanwhile, as described above, since the pattern plate 310' is positioned on an axis parallel to the central axis of the oral scanner body 1, in order for the light emitted from the optical device to be incident on the pattern plate 310', the light should be reflected 180 degrees through the reflector.

To this end, the reflector unit 400' according to another embodiment of the present invention includes a plurality of reflectors for reflecting the light emitted from the optical device of the oral scanner body 1 toward the above-described pattern plate 310' and a support portion 420' for supporting the reflectors to be inclined with respect to the oral scanner body 1.

Specifically, a first reflector 410' is disposed at an angle of 45 degrees on the central axis of the oral scanner body 1, and a second reflector 411' is disposed at an angle of 45 degrees on a longitudinal axis of the pattern plate unit 300'. That is, the first reflector 410' and the second reflector 411' are mirror symmetrical with respect to a plane positioned at the center of the central axis of the oral scanner body 1 and the longitudinal axis of the pattern plate unit 300'. In this case, the light emitted from the optical device is reflected 180 degrees through the first reflector 410' and the second reflector 411', and is incident on the pattern plate 310' provided above the second reflector 411'. The reflectors may be formed of rectangular mirrors, but are not limited thereto, and mirrors of various shapes may, of course, be applied.

The support portion 420' includes a rectangular parallelepiped body and a fixing portion extending from the body to support the first and second reflectors 410' and 411' at an angle.

In addition, the reflector unit 400' further includes a guide portion 422' to rectilinearly reciprocate in conjunction with the rotation of the rotating unit 200' to be described below. Specifically, as will be described below, a rail 142' extending in a direction parallel to the central axis of the oral scanner body 1 is formed on the inner surface of the second cover 140' so that the reflector unit 400' may rectilinearly reciprocate based on the oral scanner body 1 according to the rotation of the rotating unit 200', and the guide portion 422' is formed in a "C" shape below one side of the support portion 420' to surround the rail 142' described above.

Preferably, at least one of one end and the other end of the rail 142' may be formed with a stepped portion for restricting rectilinear movement of the reflector unit 400'.

As such, when the guide portion 422' is coupled to the rail 142', as will be described below, when the rotating unit 200' rotates, the reflector unit 400' is prevented from rotating and the moving direction of the guide unit 422' may be guided.

Preferably, a through hole to which the rotating unit 200' is coupled, which will be described below, is formed in the support portion 420', and a screw thread 421' is formed on an inner circumferential surface of the through hole.

Meanwhile, as described above, when images of the pattern plate 310' are acquired at various angles and depths, calibration accuracy may be improved.

To this end, the calibration device 1000' for an oral scanner according to another embodiment of the present invention further includes the rotating unit 200' that rotates in conjunction with the pattern plate unit 300' and the reflector unit 400' described above.

The rotating unit 200' is provided on one side of an inner circumferential surface of the body 110', and includes a rotating shaft 210', a first coupling portion 220', and a second coupling portion 230'. The rotating shaft 210' extends in a direction parallel to the central axis of the oral scanner body 1, and the first coupling portion 220' engaged with the pattern plate unit 300' is provided on one side thereof.

Specifically, the first coupling portion 220' having a spur gear shape is disposed on one side of the rotating shaft 210' and is engaged with the interlocking portion 330' of the pattern plate unit 300' described above. Accordingly, when the rotating shaft 210' is rotated, the interlocking portion 330' engaged with the first coupling portion 220' is rotated, so that the pattern plate unit 300' rotates around a longitudinal axis.

Preferably, when the rotating shaft 210' rotates 360 degrees, the pattern plate unit 300' may rotate 90 degrees, but the rotation is not limited thereto.

Preferably, the other side of the rotating shaft 210' may pass through the body 110' and extend to the outside of the body 110', and at its end, a handle 211' for allowing a user to easily rotate the rotating shaft 210' may be formed. However, the rotation is not limited to manual rotation by the user as such, and automatic rotation by a motor or the like may be made.

Preferably, as shown in FIG. 8, holding portions 240' and 241' for supporting both sides of the rotating shaft 210' so that the rotating shaft 210' is rotatable may be provided on an inner surface of the cover, and in this case, it is preferable that the holding portion 240' positioned closer to the pattern plate unit 300' supports an axis of the seating portion 320' of the pattern plate unit 300' as well as the rotating shaft 210'. More preferably, bearings for smooth rotation of the rotating shaft 210' and the pattern plate unit 300' may be provided at centers of the holding portions 240' and 241'.

On the other side of the rotating shaft 210', the second coupling portion 230' in the shape of a screw thread is formed. In addition, the second coupling portion 230' is coupled to the through hole of the support portion 420' of the reflector unit 400' described above. Specifically, the screw thread 421' corresponding to the second coupling portion 230' is formed on the inner circumferential surface of the through hole, so that the rotating shaft 210' and the reflector unit 400' are rotatably coupled to each other.

In this case, when the rotating shaft 210' is rotated about its longitudinal axis, a rotational force applied to the rotating shaft 210' by a frictional force between the screw thread 421' and the second coupling portion 230' acts on the support portion 420' of the reflector unit 400, but as described above, since the guide portion 422' formed on the support portion 420' is coupled to the rail 142' formed on the cover of the casing 100', rotation of the support portion 420' is restricted.

Accordingly, the support portion 420' rectilinearly reciprocates along a longitudinal direction of the rail 142', and thus the support portion 420' and the reflectors supported by the support portion 420' reciprocate based on the central axis of the oral scanner body 1.

Preferably, when the rotating shaft 210' rotates 360 degrees, the reflector unit 400' may rectilinearly reciprocate by 0.5 mm, but is not limited thereto.

As shown in FIGS. 9 and 10, since in conjunction with the rotation of the rotating unit 200', the pattern plate 310' is rotated and the positions of the reflectors 410' and 411' with respect to the oral scanner body 1 are changed, images of the pattern plate 310' may be acquired at various angles and depths during calibration, and thus calibration accuracy may be improved.

Hereinafter, an operating process of the calibration device 1000' for an oral scanner according to another embodiment of the present invention will be described in detail.

When a user grabs and rotates the handle 211' provided outside the body 110' of the casing 100', the rotating shaft 210' integrally formed with the handle 211' rotates. When the interlocking portion 330' engaged with the first coupling portion 220' disposed on one side of the rotating shaft 210' is rotated by the rotation of the rotating shaft 210', the pattern plate unit 300' rotates around its longitudinal axis. At the same time, a rotational force is applied to the reflector unit 400' screw-coupled to the other side of the rotating shaft 210', but the guide portion 422' of the reflector unit 400' is coupled to the rail 142' formed on the cover of the casing 100', so that the rotation of the reflector unit 400' is restricted, and thus the reflector unit 400' rectilinearly reciprocates along the rail 142'. That is, the reflector unit 400' rectilinearly reciprocates with respect to the oral scanner body 1.

As such, since in conjunction with the rotation of the rotating unit 200', the pattern plate 310' rotates and the reflectors rectilinearly reciprocate with respect to the oral scanner body 1, images of the pattern plate 310' may be acquired at various angles and depths and thus calibration accuracy may be improved.

The above description of the present invention is for illustration, and those of ordinary skill in the art to which the present invention pertains could understand that it may be easily modified into other specific forms without changing the technical spirit or essential features of the present invention. Therefore, it should be appreciated that the embodiments described above are intended to be illustrative in all respects and not restrictive. For example, each component described as a single type may be implemented in a distributed manner, and similarly, components described to be distributed may also be implemented in a combined form.

The scope of the present invention is represented by the claims to be described below, and it should be interpreted that the meaning and scope of the claims and all changes or modifications derived from the equivalents thereof come within the scope of the present invention.

| [Reference Signs List] | |
| --- | --- |
| 1 | Oral scanner body |
| 1000, 1000' | Calibration device for oral scanner |
| 100, 100' | Casing |
| 200, 200' | Rotating unit |
| 300, 300' | Pattern plate unit |
| 400, 400' | Reflector unit |

The invention claimed is:

1. A calibration device for an oral scanner, comprising:
a casing to which an oral scanner body is coupled to an open upper portion thereof;
a rotating unit rotatably provided with respect to the casing;
a reflector unit disposed on a central axis of an optical device in the oral scanner body; and
a pattern plate unit facing the optical device through the reflector unit,
wherein in conjunction with rotation of the rotating unit, the pattern plate unit rotates in place and the reflector unit rectilinearly reciprocates with respect to the oral scanner body.

2. The calibration device of claim 1, wherein the rotating unit includes:
a rotating shaft extending in a longitudinal direction;
a first coupling portion provided on one side of the rotating shaft and coupled to the pattern plate unit; and
a second coupling portion provided on the other side of the rotating shaft and coupled to the reflector unit.

3. The calibration device of claim 2, wherein a handle is provided at one end of the rotating shaft.

4. The calibration device of claim 2, wherein the pattern plate unit includes:
a pattern plate; and
a first interlocking portion integrally formed with the pattern plate and engaged with the first coupling portion, and
the first interlocking portion rotates by rotation of the first coupling portion.

5. The calibration device of claim 4, wherein the reflector unit includes:
a reflector;
a support portion configured to rotatably support the reflector; and
a second interlocking portion rotatably coupled to the support portion and engaged with the second coupling portion, and
in conjunction with rotation of the second coupling portion, the second interlocking portion rotates and the reflector is rectilinearly reciprocated.

6. The calibration device of claim 5, wherein the reflector unit further includes a rotation preventing member configured to prevent the rotation of the reflector with respect to the second interlocking portion.

7. The calibration device of claim 6, wherein the reflector moves along an inclined surface of the rotation preventing member when the reflector rectilinearly reciprocates so that an inclination angle is adjusted.

8. The calibration device of claim 7, wherein at least one of one end and the other end of the inclined surface is formed with a stepped portion configured to restrict movement of the reflector.

9. The calibration device of claim 2, wherein the pattern plate unit includes:
   a pattern plate; and
   an interlocking portion integrally formed with the pattern plate and engaged with the first coupling portion, and
   the interlocking portion rotates by rotation of the first coupling portion.

10. The calibration device of claim 9, wherein the reflector unit includes:
    a plurality of reflectors; and
    a support portion configured to support the reflectors and engaged with the second coupling portion, and
    the support portion rectilinearly reciprocates by rotation of the second coupling portion.

11. The calibration device of claim 10, wherein the reflector includes a first reflector and a second reflector,
    the first reflector is disposed to form an angle of 45 degrees on a central axis of the optical device,
    the second reflector is disposed to form an angle of 45 degrees on a longitudinal axis of the pattern plate unit, and
    the first reflector and the second reflector are disposed in mirror symmetry to reflect a direction of light emitted from the optical device 180 degrees.

12. The calibration device of claim 10, wherein the reflector unit further includes a guide portion coupled to a rail formed in the casing.

13. The calibration device of claim 12, wherein the reflector unit rectilinearly reciprocates along the rail when the second coupling portion is rotated.

14. The calibration device of claim 13, wherein at least one of one end and the other end of the rail is formed with a stepped portion configured to restrict movement of the reflector unit.

* * * * *